United States Patent [19]

Tam

[11] Patent Number: 5,383,119
[45] Date of Patent: Jan. 17, 1995

[54] METHOD AND APPARATUS FOR ACQUIRING COMPLETE RADON DATA FOR EXACTLY RECONSTRUCTING A THREE DIMENSIONAL COMPUTERIZED TOMOGRAPHY IMAGE OF A PORTION OF AN OBJECT IRRADIATED BY A CONE BEAM SOURCE

[75] Inventor: Kwok C. Tam, Schenectady, N.Y.

[73] Assignee: General Electric Company, Schenectady, N.Y.

[21] Appl. No.: 725,142

[22] Filed: Jul. 3, 1991

[51] Int. Cl.$^6$ .............................................. G06F 15/00
[52] U.S. Cl. .......................... 364/413.19; 364/413.13; 364/413.14; 364/413.15
[58] Field of Search ...................... 364/413.13, 413.14, 364/413.15, 413.19, 413.21; 382/6; 378/4

[56] References Cited

U.S. PATENT DOCUMENTS

| | | | |
|---|---|---|---|
| 5,068,882 | 11/1991 | Eberhard | 378/4 |
| 5,073,910 | 12/1991 | Eberhard et al. | 378/4 |
| 5,187,659 | 2/1993 | Eberhard et al. | 364/413.15 |

FOREIGN PATENT DOCUMENTS

| | | |
|---|---|---|
| 0430550 | 1/1991 | European Pat. Off. |
| 0488888 | 11/1991 | European Pat. Off. |

OTHER PUBLICATIONS

"Computed Tomography Scanning with Simultaneous Patient Translation", C. R. Crawford et al., Med. Phys., New York, vol. 17, No. 6, Nov./Dec. 1990, pp. 967–981.

Cone-Beam Tomography: Recent Advances and a Tutorial Review, Bruce D. Smith, Optical Engineering, May 1990, vol. 29, No. 5, pp. 524–534.

Image Reconstruction From Cone-Beam Projections: Necessary and Sufficient Conditions and Reconstruction Methods, Bruce D. Smith, IEEE Transactions on Medical Imaging, Mar. 1985, vol. MI-4, No. 1, pp. 14–25.

An Inversion Formula for Cone-Beam Reconstruction, Heang K. Tuy, Siam J. Appl. Math., Jun. 1983, vol. 43, No. 3, pp. 546–552.

Convolutional Reconstruction From Cone-Beam Projection Data, Gerald N. Minerbo, IEEE Transactions on Nuclear Science, vol. NS-26, No. 2, Apr. 1979, pp. 2682–2684.

Practical Cone-Beam Algorithm, L. A. Feldkamp, L. C. Davis and J. W. Kress, J. Opt. Soc. Am.A, vol. 1, No. 6, Jun. 1984, pp. 612–619.

P. Grangeat, "Analysis of a 3D Imaging System by Reconstruction from X-Radiographies in Conical Geometry," Ph.D. Thesis, National College of Telecommunications (l'Ecole Nationale Superieure des Telecommunications), France (1987) [translation enclosed].

*Primary Examiner*—Roy N. Envall, Jr.
*Assistant Examiner*—Ari M. Bai
*Attorney, Agent, or Firm*—Paul R. Webb, II

[57] ABSTRACT

A method and apparatus for exact three dimensional reconstruction of the image of a portion of interest of an object in the field of view of a cone beam source is disclosed, whereby unwanted Radon data are selectively disgarded avoiding undue corruption of the imaging process and missing Radon data that would otherwise be lost are selectively recovered. This is accomplished by ensuring the acquisition of a complete set of Radon data through proper choice of scanning configuration, then selectively partitioning and manipulating the acquired data to image only the select portion of interest of the object.

16 Claims, 16 Drawing Sheets

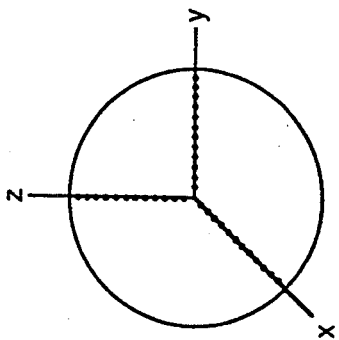
FIG. 2c DETECTOR INTEGRALS
$\int X(\theta) d\theta = \iint f(r,\theta,z_0) dr d\theta$
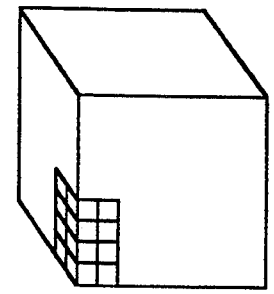
FIG. 2f 3D CT IMAGE
$\hat{f}(x,y,z)$
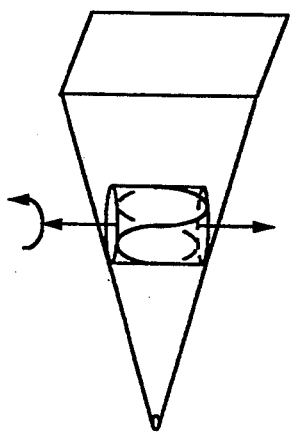
FIG. 2b CONE BEAM DETECTOR DATA
$X(\theta) = \int f(r,\theta,z_0) dr$
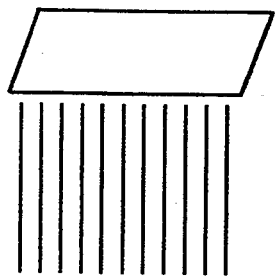
FIG. 2e PARALLEL BEAM DETECTOR DATA
$\hat{X}(\theta) = \int f(x,y,z) ds$
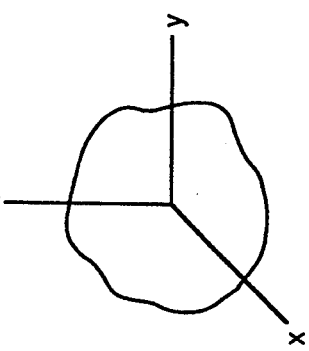
FIG. 2a PART
$f(x,y,z)$
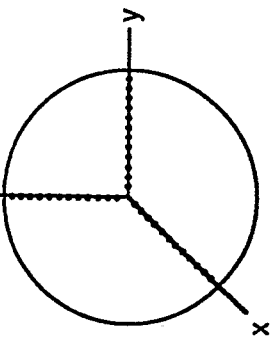
FIG. 2d RADON TRANSFORM
$\iint f(r,\theta,z_0) r dr d\theta$

METHOD AND APPARATUS FOR ACQUIRING COMPLETE RADON DATA FOR EXACTLY RECONSTRUCTING A THREE DIMENSIONAL COMPUTERIZED TOMOGRAPHY IMAGE OF A PORTION OF AN OBJECT IRRADIATED BY A CONE BEAM SOURCE

CROSS-REFERENCE TO RELATED APPLICATIONS

The invention disclosed and claimed herein is related to the subject matter of the following commonly-assigned patent applications, the entire disclosures of which are hereby expressly incorporated herein by reference:

Co-pending application Ser. No. 07/631,815, filed Dec. 21, 1990 now U.S. Pat. No. 5,257,183, by Kwok C. Tam, entitled "METHOD AND APPARATUS FOR CONVERTING CONE BEAM X-RAY PROJECTION DATA TO PLANAR INTEGRALS AND RECONSTRUCTING A THREE-DIMENSIONAL COMPUTERIZED TOMOGRAPHY (CT) IMAGE OF AN OBJECT;

Co-pending application Ser. No. 07/631,818, filed Dec. 21, 1990 now abandoned, by Kwok C. Tam, entitled "PARALLEL PROCESSING METHOD AND APPARATUS FOR RECONSTRUCTING A THREE-DIMENSIONAL COMPUTERIZED TOMOGRAPHY (CT) IMAGE OF AN OBJECT FROM CONE BEAM PROJECTION DATA OR FROM PLANAR INTEGRALS";

Co-pending application Ser. No. 07/572,651, filed Aug. 27, 1990 now U.S. Pat. No. 5,073,910, by Jeffrey W. Eberhard et al, entitled "SQUARE WAVE CONE BEAM SCANNING TRAJECTORY FOR DATA COMPLETENESS IN THREE DIMENSIONAL COMPUTERIZED TOMOGRAPHY";

Co-pending application Ser. No. 07/572,590, (RD-19694) filed Aug. 27, 1990 now U.S. Pat. No. 5,068,882, by Jeffrey W. Eberhard et al, entitled "DUAL PARALLEL CONE BEAM CIRCULAR SCANNING TRAJECTORIES FOR REDUCED DATA INCOMPLETENESS IN THREE-DIMENSIONAL COMPUTERIZED TOMOGRAPHY"; and Co-pending application Ser. No. 07/631,514, filed Dec. 21, 1990 now U.S. Pat. No. 5,270,926 by Kwok C. Tam, entitled "METHOD AND APPARATUS FOR RECONSTRUCTING A THREE-DIMENSIONAL COMPUTERIZED TOMOGRAPHY (CT) IMAGE OF AN OBJECT FROM INCOMPLETE CONE BEAM PROJECTION DATA".

BACKGROUND OF THE INVENTION

The present invention relates generally to three dimensional (3D) computerized tomography (CT) and more specifically to an improved method and apparatus for acquiring complete projection data for exact image reconstruction of a portion of an object irradiated by a cone beam source.

Conventional CT employs a technique for obtaining cross sectional slices of an object from planar parallel or fan beam irradiation of an entire object. The technique is primarily utilized in medical and industrial diagnostics. Image reconstruction techniques have been predominantly two dimensional. In two dimensions, an undistorted image of an object can be mathematically reconstructed in an exact manner by back projecting a parallel beam which has been attenuated after passing through the object using an inverse transform based on the Fourier Slice Theorem. The use of a parallel beam source and a flat two dimensional detector geometrically simplifies reconstruction but complicates practical considerations having to do with speed and ease of data collection.

Back projections can be mathematically accomplished for a cone beam source by inverse Radon transforming suitable planar integrals. The planar integrals are computed from detector integrals which utilize the measured cone beam projection data i.e. the detected attenuated intensity representative of the density distributions of the object. The use of a cone beam source expedites data acquisition; although when used with a flat detector, complicates geometrical considerations. In the two dimensional case using fan beam geometry, the detector integral are equivalent to the Radon transform of the object. Conventional three dimensional CT imaging typically involves stacking slices representative of the density distribution through the object obtained from various parallel or fan beam attenuation projections. Each projection is associated with a particular view angle or configuration of source and detector relative to the object. A data set is generally acquired by either rotating a source and detector, fixed relative to each other, around an object taking projections as the object is scanned; or alternatively, rotating the object between the fixed source and detector. Unlike the two dimensional case, a direct Radon inversion of three dimensional cone beam data from a cone beam source is not possible. Before the inverse Radon transform can be undertaken, the cone beam detector integrals must be reconfigured into planar integrals suitable for inverse Radon transformation.

This problem was addressed in two commonly assigned patent applications: U.S. patent application Ser. No. 07/631,815 filed Dec. 18, 1990 now U.S. Pat. No. 5,257,183 by Kwok C. Tam entitled METHOD AND APPARATUS FOR CONVERTING CONE BEAM X-RAY PROJECTION DATA TO PLANAR INTEGRAL AND RECONSTRUCTING A THREE-DIMENSIONAL COMPUTERIZED TOMOGRAPHY (CT) IMAGE OF AN OBJECT discloses method and apparatus for converting cone beam data to values representing planar integrals on any arbitrary set of planes in Radon space for 3D image reconstruction through inverse Radon transformation. A related U.S. patent application Ser. No. 07/631,818 filed on Dec. 21, 1990 now abandoned by Kwok C. Tam entitled PARALLEL PROCESSING METHOD AND APPARATUS FOR RECONSTRUCTING THREE-DIMENSIONAL COMPUTERIZED TOMOGRAPHY (CT) IMAGE OF AN OBJECT FROM CONE BEAM PROJECTION DATA OR FROM PLANAR INTEGRALS discloses a two step approach for performing an inverse Radon transform from planar integrals obtained on a plurality of coaxial planes. The first step involves calculating from the planar integrals a two dimensional projection image of the object on each of the coaxial planes; while the second step involves defining normal slices through these coaxial planes from which a two dimensional reconstruction of each slice is obtained. In this slice by slice way, the reconstruction algorithms operate on the plurality of planar integrals to produce a three dimensional image of the object.

It is further essential to note that the acquired data set is complete only if it provides data at every point in Radon space, i.e. Radon space must be sufficiently filled with data over the region of support in Radon space which topologically corresponds to a region of support in the object space. Radon data is typically acquired by exposing the entire object within the field of view of the source. Sufficient filling of Radon space by various scanning configurations is necessary for exact image reconstruction. Furthermore, if the detector integral space is filled over the region of support in Radon space for the object, the data set is complete. Bruce D. Smith in an article entitled "Image Reconstruction from Cone-Beam Projections: Necessary and Sufficient Conditions and Reconstruction Methods," IEEE Trans. Med. Imag., MI-4 (1985) 14, has shown that a cone beam data set is complete if each plane passing through the object cuts the scanning trajectory in at least one point. This criterion assumes that the detector is fixed relative to the source and that the entire object can be scanned within the field of view of the source. Depending on the scanning configuration employed to obtain the cone beam projection data, the data set in Radon space may or may not be complete. Utilizing an incomplete data set in image reconstruction by Radon inversion introduces artifacts which compromise image quality and may render the image inadequate for medical or industrial diagnostic use. A scanning configuration is suggested by Gerald N. Minerbo, "Convolutional Reconstruction from Cone-Beam Projection Data" IEEE Trans. Nucl. Sci., Vol. NS-26, No. 2, pp. 2682–2684 (April 1979); and Heang K. Tuy, "An Inversion Formula for Cone-Beam Reconstruction", SIAM J. Math., Vol. 43, No. 3, pp. 546–552 (June 1983) which Smith in his 1985 article identifies as satisfying the completeness criterion. This scanning configuration comprises two circular trajectories whose axes of rotation are normal with respect to one another. Such a scanning configuration is not practical. Another complete scanning trajectory has been recently disclosed in commonly assigned U.S. patent application Ser. No. 07/572,651, filed Aug. 27, 1990 now U.S. Pat. No. 5,073,910, by Eberhard et al entitled "SQUARE WAVE CONE BEAM SCANNING TRAJECTORY FOR DATA COMPLETENESS IN THREE-DIMENSIONAL COMPUTERIZED TOMOGRAPHY". A scanning configuration which minimizes data incompleteness is disclosed in commonly-assigned U.S. patent application Ser. No. 07/572,590, filed Aug. 27, 1990 now U.S. Pat. No. 5,068,882, by Eberhard entitled "DUAL PARALLEL CONE BEAM CIRCULAR SCANNING TRAJECTORIES FOR REDUCED DATA INCOMPLETENESS IN THREE DIMENSIONAL COMPUTERIZED TOMOGRAPHY". While effective to eliminate or reduce data set incompleteness, each of these approaches adds complexity to the scanning configuration either by requiring scanning in a direction other than about the axis of rotation or by requiring additional source/detector pairs. Accordingly, the scanning geometry most commonly adopted is the circular scanning trajectory which engulfs the entire object in the field of view of the source.

Commonly assigned U.S. patent application Ser. No. 07/572,590 discloses an apriori approach to reducing the effects of incompleteness on three dimensional cone beam reconstruction by correcting two dimensional projection images obtained on each of a plurality of coaxial planes in Radon space using optically obtained object boundary information. From this, a three dimensional image is reconstructed from slices normal to the common axis in a slice by slice manner using two dimensional reconstruction on each slice. This apriori corrective approach is not exact in that it is not an inherently a three dimensional CT reconstruction.

SUMMARY OF THE INVENTION

Accordingly it is an object of the invention to provide method and apparatus for exactly reconstructing a three dimensional CT image of a select portion of an object wherein said portion lies within the field of view of at least one cone beam source by arranging scanning along the upper and lower extent of a region of support in the object space enclosing the portion of interest using two spaced, mutually parallel, otherwise complete scanning trajectories; then, selectively manipulating the acquired data by partitioning surfaces of integration corresponding to said data relative to boundaries defined by said upper and lower extent. Said manipulation of data so partitioned provides elimination of unwanted contributions by selectively disregarding data according to whether or not an arbitrary surface of integration, e.g. plane, intersects the portion of interest and also either the region above the upper extent boundary or below the lower extent boundary. Said manipulation of data so partitioned further provides recovery of otherwise lost contributions by selectively combining data according to whether or not an arbitrary surface of integration, e.g. plane, intersects the portion of interest and also both the region above the upper extent boundary and the region below the lower extent boundary. Said method of eliminating unwanted contributions and recovering missing information, provides the proper filling of Radon space and thereby provides a complete data set from which an uncompromised image of only said portion of interest can be exactly reconstructed. Thus, the scanning path may be considered a complete scanning path in that it provides complete data for said portion of interest (select portion).

It is a related object of the invention that this method is inherently exact using no apriori information to fill in missing or truncated Radon data.

It is a further object of the invention to eliminate artifacts due to non-exact reconstruction methods.

It is yet a further object of the invention that missing data in Radon space due to truncation of the object by the field of view of the source can be recovered by suitable data manipulation utilizing partitioning of data according to select scan boundaries about the portion of interest.

It is still another object of the invention than unwanted data in Radon space due to beam penetration beyond the portion of interest can be eliminated by suitable data manipulation utilizing partitioning of data according to select scan boundaries about the portion of interest.

It is yet another object of the invention that an uncompromised image of only the portion of interest be obtained without corruption of said image.

Yet another object of the invention is to provide such an image without requiring additional measurements, further radiation exposure, or the expense of extra computation.

It is still another object of the invention to provide faster, better images and extend the scope of applicability for exact three dimensional CT image reconstruction to include any select portion of an object that might be of interest to image.

BRIEF DESCRIPTION OF THE DRAWINGS

FIGS. 2a, 2b, 2c, 2e and 2f are diagrams depicting a generalized Radon transform approach to three dimensional CT imaging;

FIG. 13 illustrates diagrammatically the angular range for which FIG. 12 is the case, indicating the correspondingly missing Radon data;

DETAILED DESCRIPTION OF THE INVENTION

Figure 1:
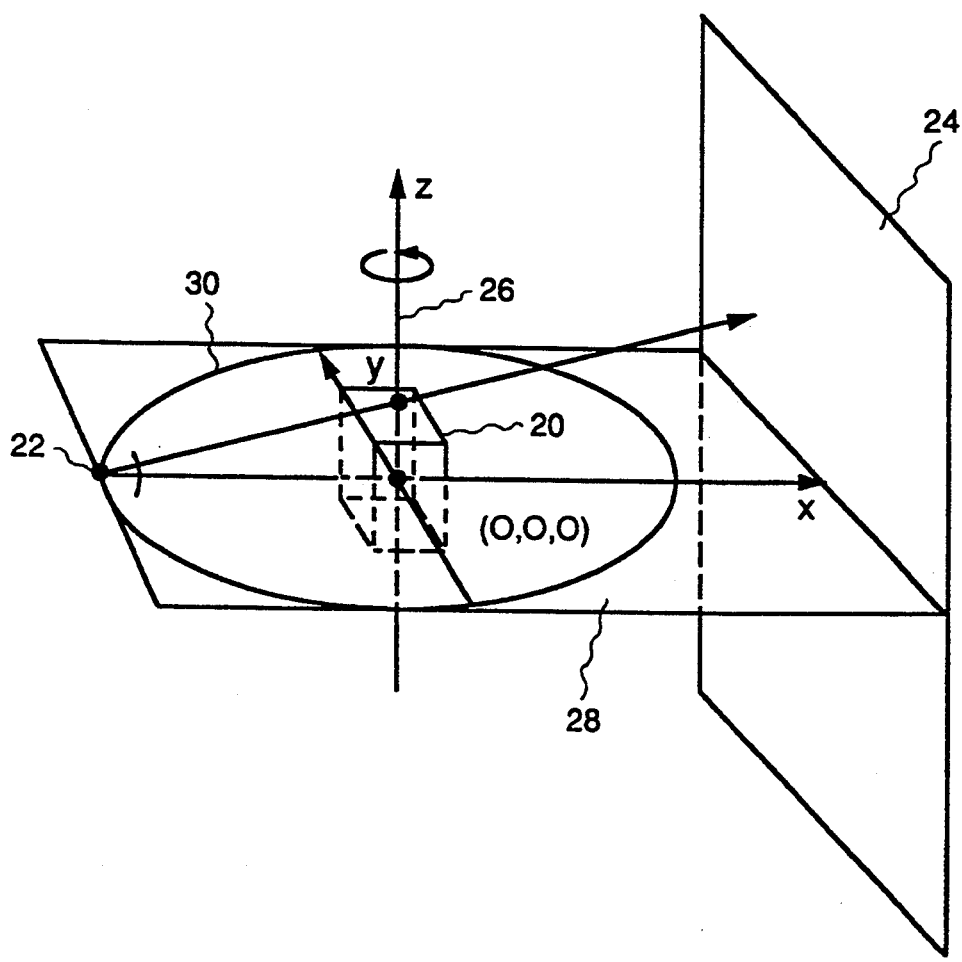
FIG. 1 illustrates conventional scanning geometry for three dimensional CT scanning.

Referring initially to FIG. 1, a typical scanning and data acquisition configuration employing cone beam geometry is depicted. An object 20 is positioned within the field of view between a cone beam point source 22 and a typical two dimensional detector array 24, which provides cone beam projection data. An axis of rotation 26 passes through the field of view and the object 20. For purpose of analysis, a midplane 28 is defined normal to the axis of rotation 26 which contains the cone beam point source 22. By convention, the axis of rotation 26 is generally taken to be the z axis, having its origin at its intersection with the midplane. The (x,y,z) coordinate system is fixed relative to the source 22 and detector 24. In scanning the object 20 at a plurality of angular positions, the source 22 moves relative to the object and the field of view typically rotates along a circular scanning trajectory 30 lying in the midplane 28, while the detector 24 remains fixed with respect to the source 22 (or alternatively the object 20 can be rotated while the source 22 and detector 24 remain stationary). Data is acquired at a plurality of source positions during the scan. Data collected at the detector 24 represent line integrals through the object 20. The approach to reconstruction then embodies calculating planar integrals on a set of planes from various line integrals through the object, then performing an inverse Radon transform on the planar integrals to reconstruct a three dimensional image of the object. It must be noted that data collected in such a single circular scan is incomplete (See Smith, 1985, above), and artifacts may accordingly be introduced into the reconstructed image.

Data completeness can be illustrated most clearly and rigorously in terms of the Radon transform approach to three dimensional imaging, represented in FIGS. 2a through 2f and FIG. 3. A point occupied by the object itself is defined in terms of its attenuation coefficient $f(x,y,z)$ as seen in FIG. 2a. The measured cone beam projection data then correspond to a line integral of this function in the radial direction as shown in FIG. 2b where "s" indicates the beam source. The detector integrals are then given by the line integrals of the cone beam projection data which correspond to surface integrals in terms of attenuation as seen in FIG. 2c. For a cone beam source, the Radon transform is given in FIG. 2d, which differs in form from the detector integral of FIG. 2c by a factor of "r". Copending application Ser. No. 07/631,815 filed on Dec. 21, 1990 now U.S. Pat. No. 5,257,183 by Kwok C. Tam entitled METHOD AND APPARATUS FOR CONVERTING CONE BEAM X-RAY PROJECTION DATA TO PLANAR INTEGRALS AND RECONSTRUCTING A THREE-DIMENSIONAL COMPUTERIZED TOMOGRAPHY (CT) IMAGE OF AN OBJECT discusses an intermediate step for converting cone beam detector integrals (line integrals) to planar integrals in a form suitable for inverse Radon transform (i.e. Radon data). Radon space must be filled with data over a region of support in Radon space which corresponds to the region of support in object space occupied by the portion of the object within the field of view of the source. In other words if the detector integral space is filled over a region of support representing the object, the Radon data set is complete and exact image reconstruction is possible. It is instructive to note that completeness of the Radon data set can be assured through the proper choice of scanning trajectory. FIGS. 2e and 2f illustrate the Radon inversion process for reconstructing a three dimensional image from the detector integrals for the simple case of a parallel beam which inverts directly, i.e. no intermediate conversion step is required.

Figure 3:
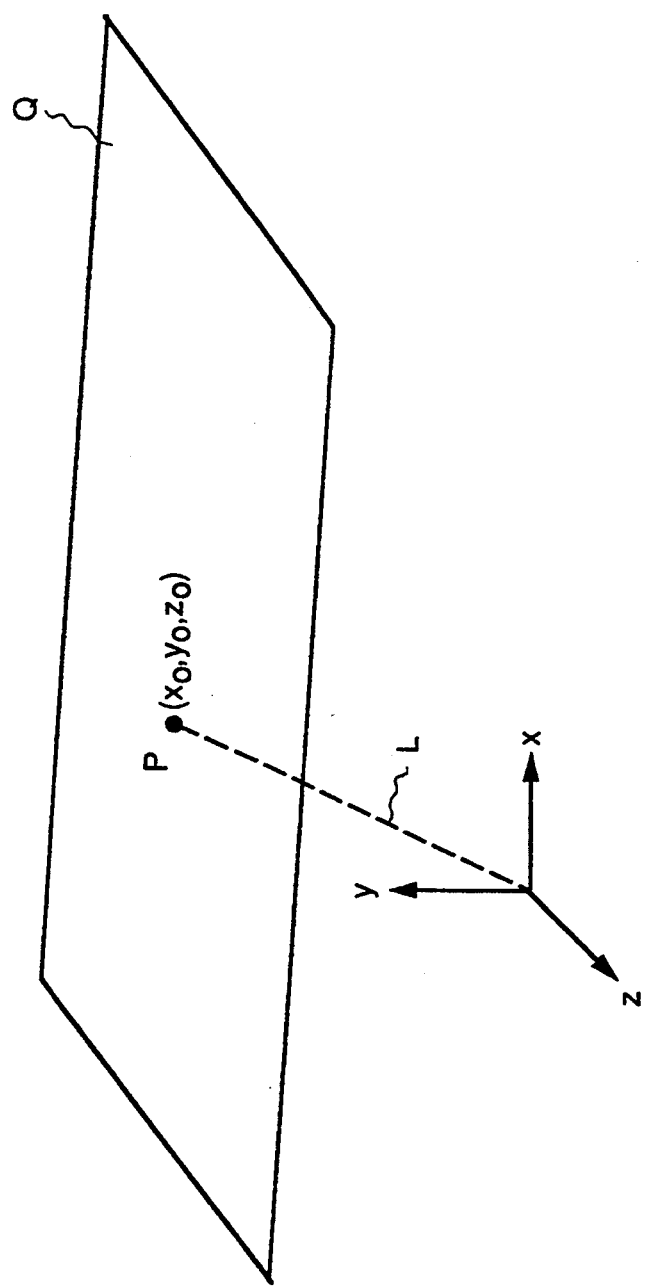
FIG. 3 is a representation of a technique for calculating the Radon transform of an object at a given point using a normal surface of integration.

FIG. 3 illustrates in three dimensions the Radon transform of an object at an arbitrary point P at $x_0,y_0,z_0$ is given by the surface integral of the source beam attenuation coefficient over a planar surface of integration, Q, passing through $x_0,y_0,z_0$ normal to a connecting line, L, from the origin to point $x_0,y_0,z_0$. Note that in two dimensions, this integral is taken over a line rather than a surface.

Any scanning configuration and method of data acquisition provides data over some volume of Radon space. Assuring proper filling of Radon space over the region of support corresponding to the field of view occupied by the object in object space, amounts to meeting the completeness criterion. FIGS. 4 through 8 address the filling of Radon space using circular scanning trajectories to scan an object wholly contained within the field of view of a source to illustrate basic principles. FIGS. 9 through 17 apply such principles to selective data manipulation in order to effectively scan and selectively acquire data in order to provide sufficiently complete Radon data for the exact imaging of just a portion of interest of an object exposed to cone beam source. This involves acquiring Radon data over a region of support which corresponds to the field of view in object space into which the portion of interest fits, i.e. satisfying the completeness criterion.

Figure 4A:
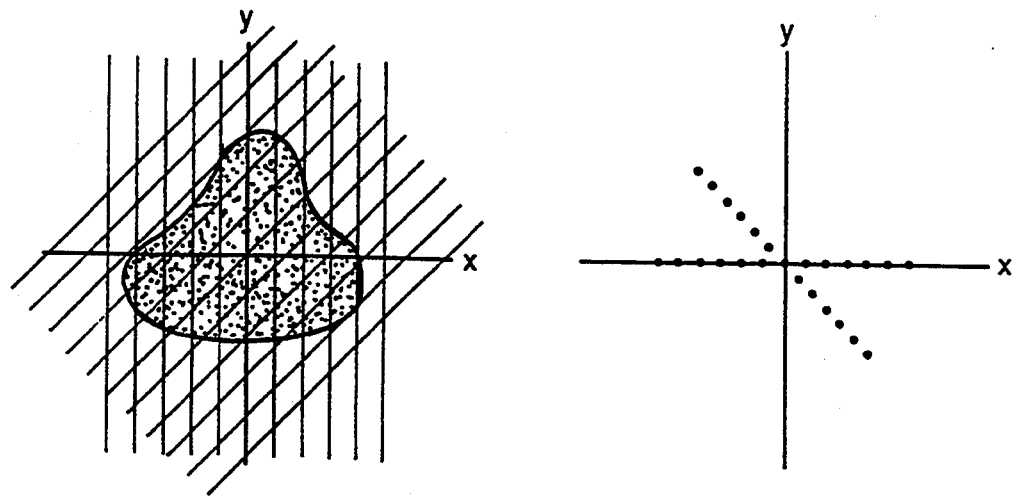
FIGS. 4a and 4b depict a technique for filling Radon space with data using two dimensional parallel and fan beam illumination.
Figure 4B:
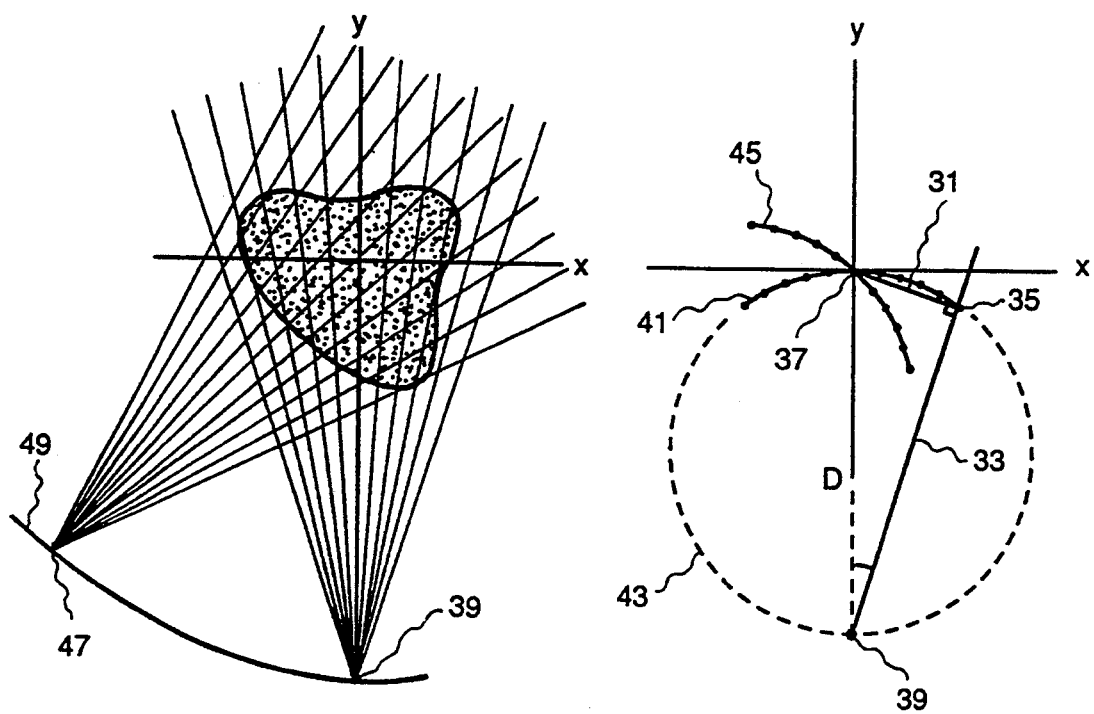

FIG. 4a represents Radon space filling for the case of a two dimensional parallel source beam. The beam paths for two view angles are shown radiating through the object. The corresponding data points in Radon space are indicated. For each point in Radon space, a connecting line is extended from the origin to a point of interest, and the source intensity is integrated over a line passing through that point which is normal to a connecting line. Such points are illustrated for each parallel ray depicted in two view angles. The two dimensional fan beam case is shown in FIG. 4b, wherein the geometry is more complicated than the parallel beam case. By way of example, the extreme right-hand of the fan beam 30 is analyzed in FIG. 4b. Normal line 31 is constructed perpendicular to the ray 33. It may be noted that the point of interest 35 forms a right triangle with the origin 37 and the source point 39 and so defines an arc 41 that traces a circular path 43 shown as a dotted line for a given view angle. This is generally true for any point in Radon space acquired with the source and detector in this given position. Therefore, by geometry, the points in Radon space lie on the arc of a circle whose diameter "D" is given by the distance between the source 39 and the object centered axis of rotation 37. Similar arcs 43, 45 are constructed for a plurality of view angle positions 39, 47 along a given scanning trajectory 49 around the object. Such circular arcs will trace a torus defining the volume of Radon data collected for a complete (360 degree) circular scanning trajectory. Note a partial arc 45 is shown corresponding to an alternate view angle 47, i.e. source position, indicating how Radon data would be collected at another position along the scan path 49. Taken together, these diagrams illustrate how to construct a torus in Radon space centered at the origin 37 representing all of the radon data collected along a particular circular scan path 49.

Figure 5:
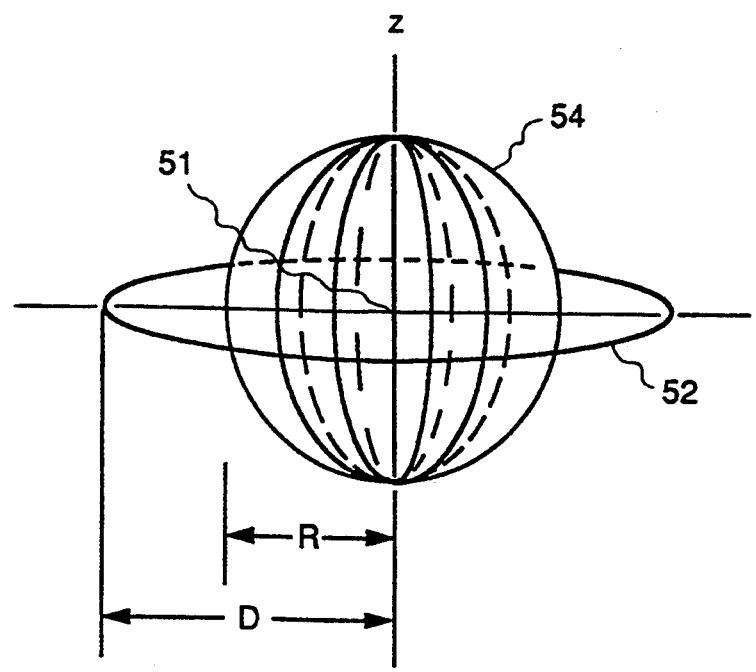
FIG. 5 depicts a singular circular scanning trajectory corresponding to FIG. 1 for prior art scanning of an object enclosed by a spherical region support in the object space.
Figure 6:
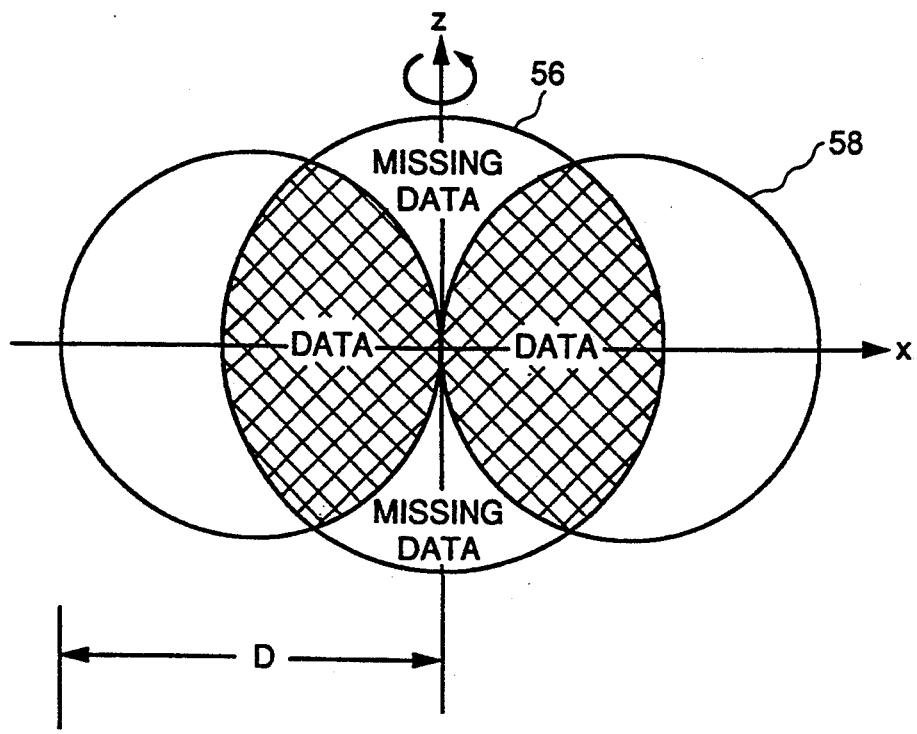
FIG. 6 is a two dimensional cross section illustrating the corresponding Radon data provided by the scan of FIG. 5.

The process can be visualized more clearly in FIGS. 5 and 6 wherein FIG. 5 depicts a single circular cone beam source scanning trajectory 52 of radius D, about a spherical region of support in the object space 54 of radius R. The spherical region of support in the object space in the field of view encloses the object to be scanned and provides the region of support in Radon space for that object. FIG. 6 depicts in cross-section the intersection of a sphere 56 of equal radius (R) in Radon space comprising the region of support in Radon space for the spherical region of support in object space in the field of view 54 with toric volume 58 constructed to represent the scanned region in Radon space for which Radon data are available. Note according to FIG. 4b the diameter of each toric circular section is given by the origin to source distance, D. Thus, in Radon space, data for image reconstruction are available at those points within the sphere 56 where the sphere intersects the toric volume 58, as indicated by the word "data". Data are absent for points on the top and bottom of the spherical region of support in Radon space 56 because these points correspond to planes parallel and near parallel to the midplane and data for these planes are not available due to the cone beam nature of the source. The region of missing data narrows closer to the midplane; wherein all data are available directly on the midplane. In order to satisfy Smith's completeness criterion, there must be at least a point from the source scanning trajectory on each plane passing through the object of interest. Therefore, with regard to FIG. 5, it can be seen that a number of horizontal and near horizontal planes pass through the spherical region of support in object space 54 without intersecting the source scanning trajectory 52. These planes are exactly those that correspond to the missing data in Radon space so identified in FIG. 6. This graphical construction of available and missing data can be made directly from FIG. 5 by choosing an arbitrary point within the region of support in object space 54; dropping a connecting line from this point to the origin; and analyzing the plane normal to this connecting line at this point in order to determine whether or not this normal plane intersects the scanning trajectory 52 and the region of support in object space 54. FIG. 4b is an example of this type of construction. If the plane so accommodates these conditions, Radon data is available at that point; if not Radon data is missing at that point. The Radon data forms a complete set only if each and every plane passing through the object intersects the scanning trajectory in at least one point. Such analysis depends on the geometry of the region of support in object space as well as that of the scanning trajectory; and further assumes the source and detector are fixed relative to one another. According to this analysis the prior art scanning trajectory of FIG. 5 provides a complete Radon data set only at the midplane. The goal of proper scanning for exact three dimensional reconstruction is to provide a complete Radon data set throughout the volume given by the region of support in Radon space.

Figure 7:
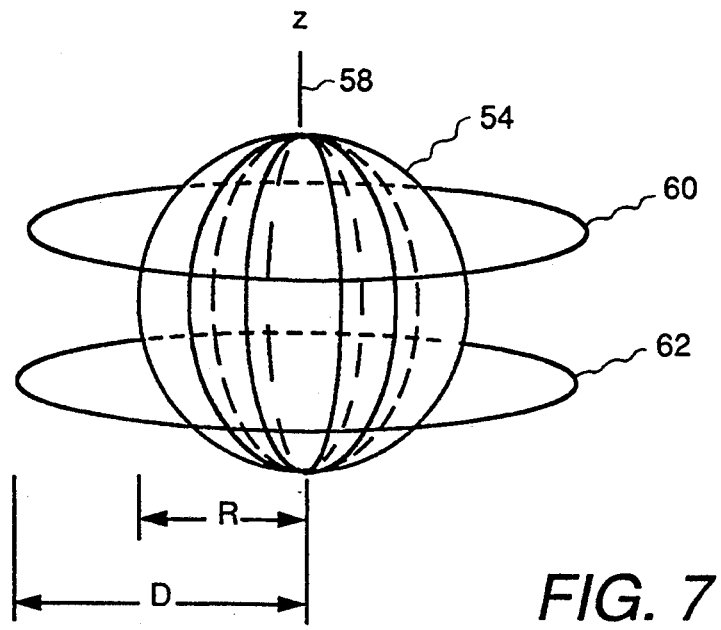
FIG. 7 similarly depicts two spaced circular scanning trajectories normal to a common axis of rotation passing through the diameter of a spherical region of support in the object space.
Figure 8:
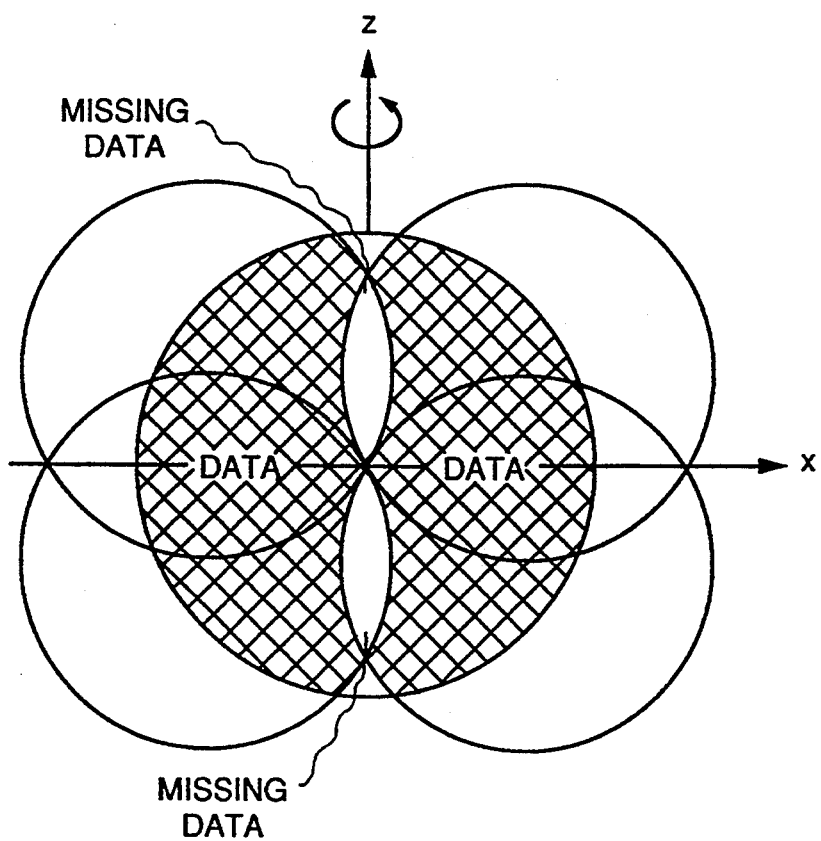
FIG. 8 is a two dimensional cross sectional projection which correspondingly depicts those regions of available and missing data in Radon space provided by the scanning configuration of FIG. 7.

FIG. 7 depicts the scanning trajectory disclosed in previously referenced copending patent application Ser. No. 07/572,590 now U.S. Pat. No. 5,068,882. FIG. 7 illustrates a scanning configuration comprised of two mutually spaced circular scanning trajectories 60, 62 each having a plane of rotation normal to a common axis of rotation 58 passing diametrically through a spherical region of support in the object space 54. It is shown that this practical dual parallel scanning trajectory significantly reduces, but does not eliminate, the amount of missing Radon data. Using the simple topological construction technique discussed with reference to FIGS. 5 and 6, it is apparent that there exist planes which intersect the spherical region of support in the object space, but fail to intersect at least one point of one of the scanning trajectories; thus, the Radon data set is known to be incomplete by visual inspection using this construction technique. In FIG. 8 such topologically constructed missing data is labelled and diagrammatically identified relative to the source scanning trajectories and the region of support in object space. Although, the orientation of the cone beam illumination field along each scan path can be selected to minimize the amount of missing data, missing data cannot be eliminated from the two parallel circular scan path trajectories.

Figure 9:
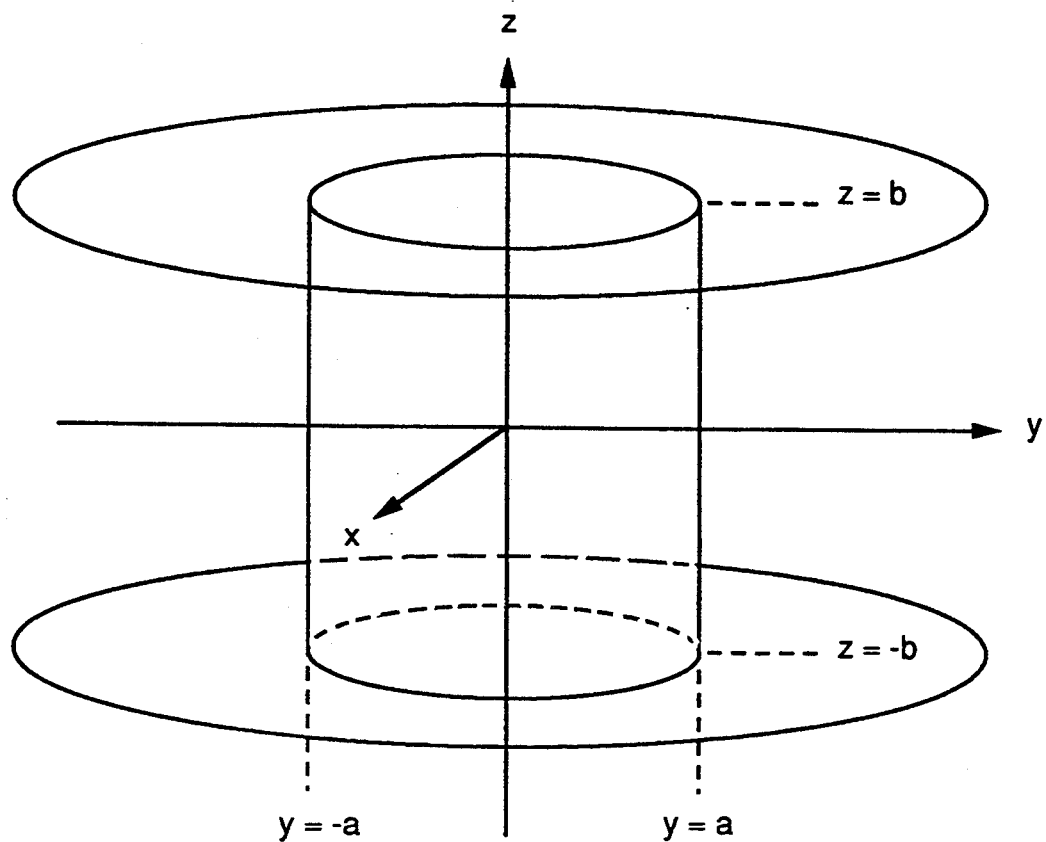
FIG. 9 depicts an object to be inspected according to the invention wherein the region of support in object space encasing the portion of interest is characterized by a cylinder whose axis is normal to two spaced circular scanning trajectories.
Figure 10:
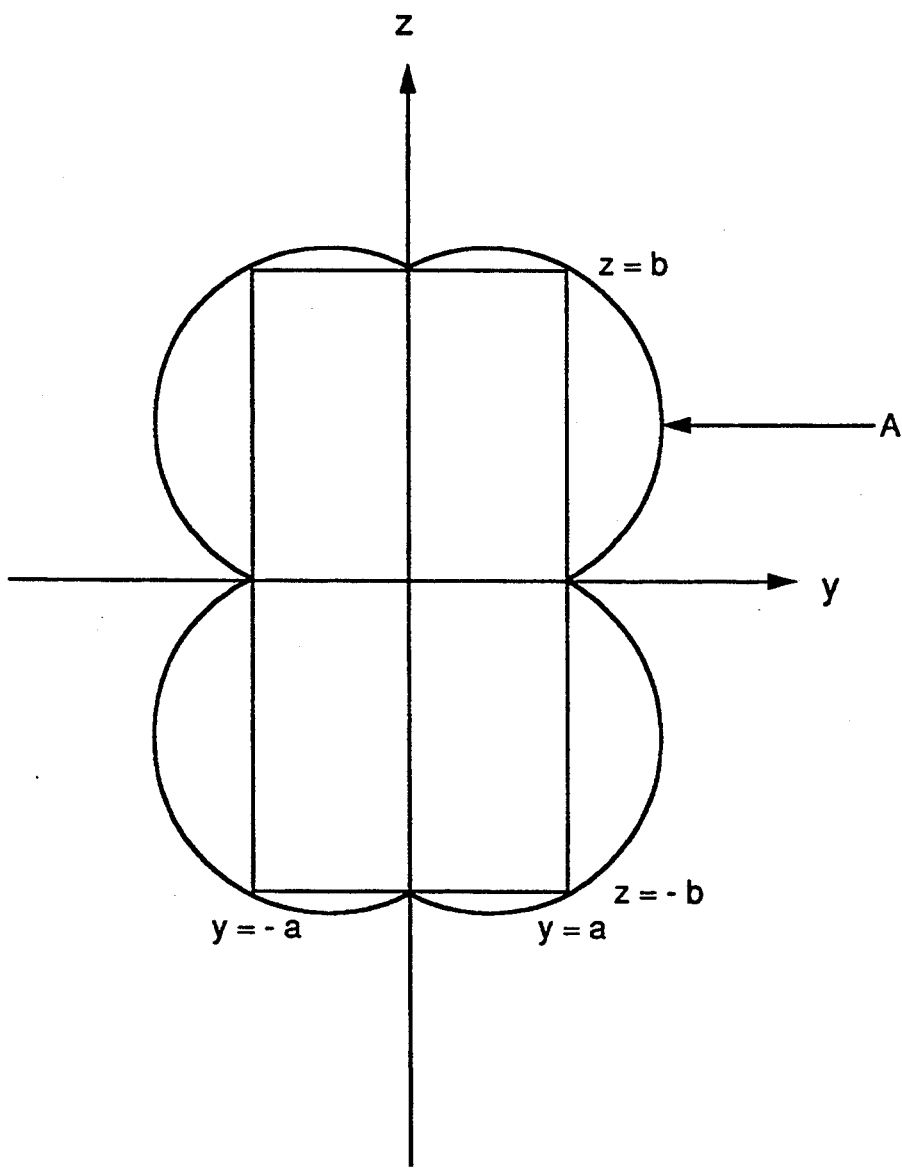
FIG. 10 illustrates a vertical plane in Radon space and a boundary identified as curve A bounding the minimum necessary Radon data for reconstructing the cylindrical object of FIG. 9.
Figure 11:
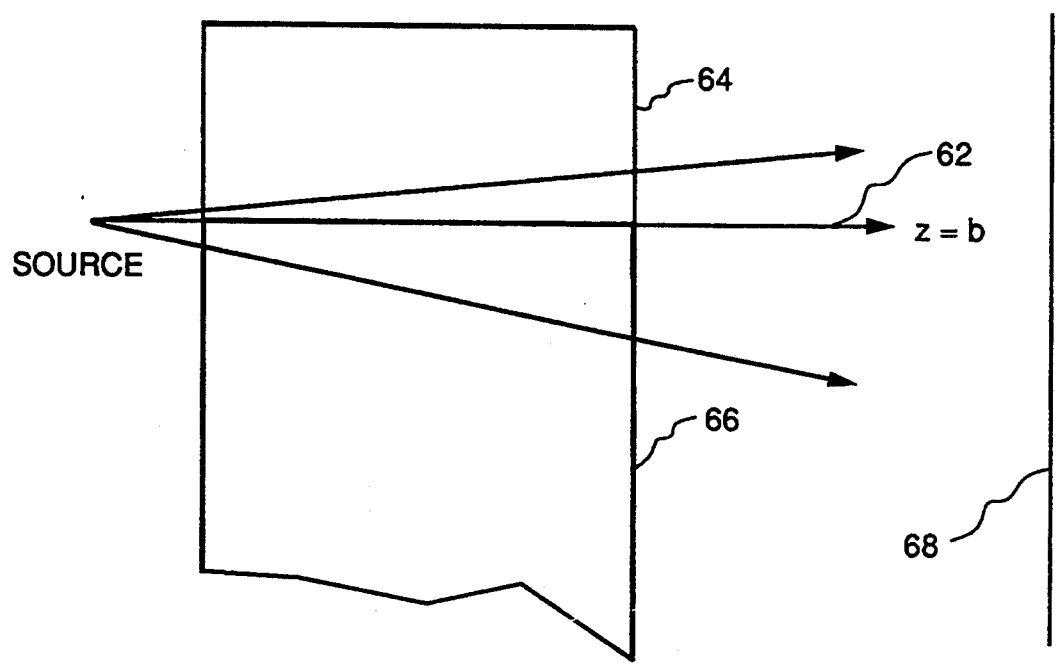
FIG. 11 illustrates a top scan wherein the source beam intersects either the portion of interest at scan level or above or below scan level, but not both.

If the object to be inspected is longer in one dimension than the detector dimensions because the object is too long in that dimension or alternatively only a portion of the object is of interest to image; some of the requisite cone beam data would be missing. Furthermore, since some of the source beams penetrate the remainder of the object as well as the portion of interest, the cone beam data collected is not attributable solely to the portion of interest i.e. the Radon data is corrupted. Consider such an object to be scanned which, for the sake of this analysis, is encased by a region of support in the object space, herein preferably taken to be a cylinder. This region of support in the object space is bounded at an upper and lower extent. Furthermore, let a scan path trajectory be taken about the upper extent of the cylindrical region of support in the object space being connected via any joining scan path to a scan path trajectory about the lower extent of the region of support in the object space. For the sake of example, the upper and lower scan trajectories are preferably taken to be spaced circular trajectories normal to a common axis of rotation, z; wherein, the cylindrical symmetry of the region of support in the object space is taken about this z axis. This scanning configuration is illustrated in FIG. 9 for a cylindrical region of support in the object space of radius a and length $2b$ symmetrical about the z axis and centered at the origin. On each vertical plane containing the axis of rotation, a two dimensional projection of this cylindrical region of support in the object space presents a $2a \times 2b$ rectangle as shown in FIG. 10. To recover the two dimensional projection image of the object on such a vertical plane, all the Radon data inside the curve labelled A in FIG. 10 is needed. Curve A is constructed such that a line through any point inside curve A orthogonal to a line joining the origin to that point intersects the rectangular projection of the cylindrical region of support in the object space.

To assess the adequacy of the filling of Radon space with Radon data according to the invention; first, categorize each of the integration planes which contribute to points in Radon space as follows:

1. A plane that does not intersect the portion of interest;
2. A plane that intersects the portion of interest only;
3. A plane that intersects the portion of interest and also either the region above or the region below, but not both;
4. A plane that intersects the portion of interest and also both the region above or the region below.

For case 1, the planar integral will be zero so no further consideration of case 1 is required.

For case 2, the planar integral is computed from the cone beam data according to copending application Ser. No. 07/631,815.

For case 3, the planar integral is computed from the top scan data or the corresponding bottom scan data as follows: See FIG. 11. A scan at the top scan level ($z=b$) 62 provides cone beam rays that will intersect either the region of the object above $z=b$ 64 or the region below it 66, or at the $z=b$ level itself 62. But, a cone beam ray cannot intersect more than one of these three regions. See FIG. 11. The region that will be intersected by the ray can be determined from the position on the detector 68 at which the beam intersects. Thus, the unwanted contribution of that portion of the object beyond the $z=\pm b$ level to the computation of the planar integrals can be eliminated by discarding all the cone beam data whose paths traverse the region beyond the $z=+b$ level respectively.

Figure 12:
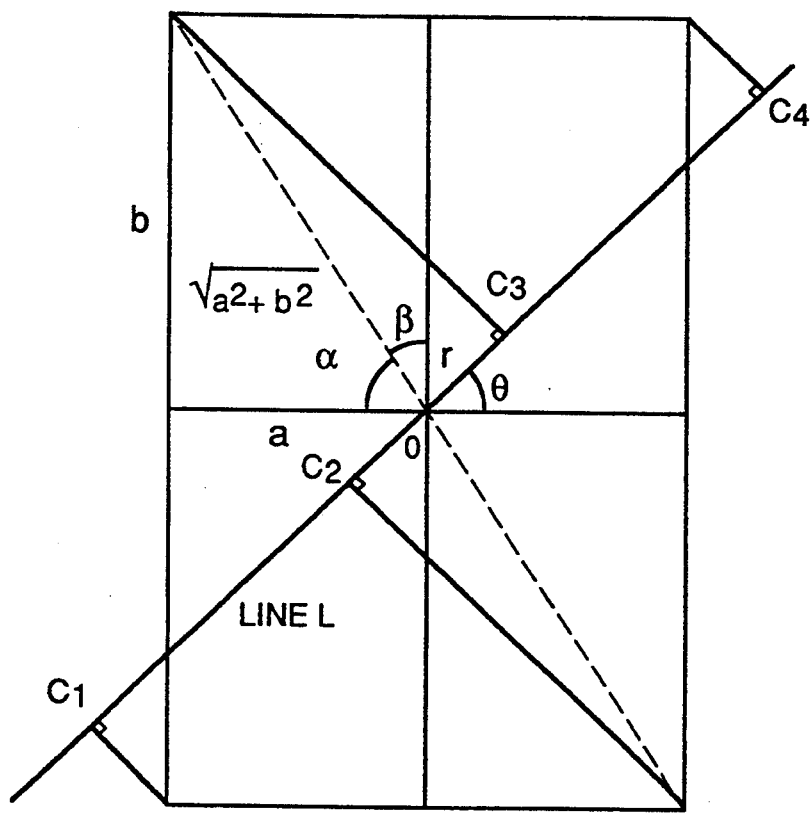
FIG. 12 is an illustrative linear projection indicating the case where normal surface of integration planes corresponding to points in Radon space intersect the portion of interest and also either the region above the portion of interest or the region below the portion of interest, but not both.

For the case of portion of interest scanning, any planar integral on a plane intersecting the cylinder beyond the height level $z=\pm b$ contains contributions from other than the portion of interest and therefore is corrupted and unavailable. This means that for each coaxial plane containing a 2D projection of the cylinder, the Radon datum at a point inside the curve A would be missing if the line passing through that point orthogonal to the line joining the origin and that point intersects the top and bottom edges of the rectangle. Consider a line L on a coaxial plane through the origin at an angle $\theta$ to the horizontal axis, as shown in FIG. 12. Orthogonally project the four corners of the rectangle onto line L at $C_1$, $C_2$, $C_3$, and $C_4$. These projections constitute the boundaries of the top and bottom edges of the projected cylinder. At any point P defined by r and $\theta$ on line L, the line through P orthogonal to line L will intersect the top and bottom edges of the rectangle only if P lies between $C_1$ and $C_2$, or between $C_3$ and $C_4$ as line segments $C_1C_2$ and $C_3C_4$ are the orthogonal projections of the top and bottom edges of the rectangle on line L respectively. This indicates the Radon datum at point P will be missing. Radon data will be available only if P lies between $C_2$ and $C_3$. This means that radius, $$r_{max} = |OC_3| = \sqrt{a^2 + b^2} \cos(\beta + \pi/2 - \theta) \tag{1}$$

where $\beta = \tan^{-1}(a/b)$ provides the maximum radius at angle $\theta$ below which Radon data are available. Therefore, Radon data are missing in the angular range $$\theta \in [-\beta, \beta]$$

and $$\theta \in [\pi - \beta, \pi + \beta[$$

Figure 13:
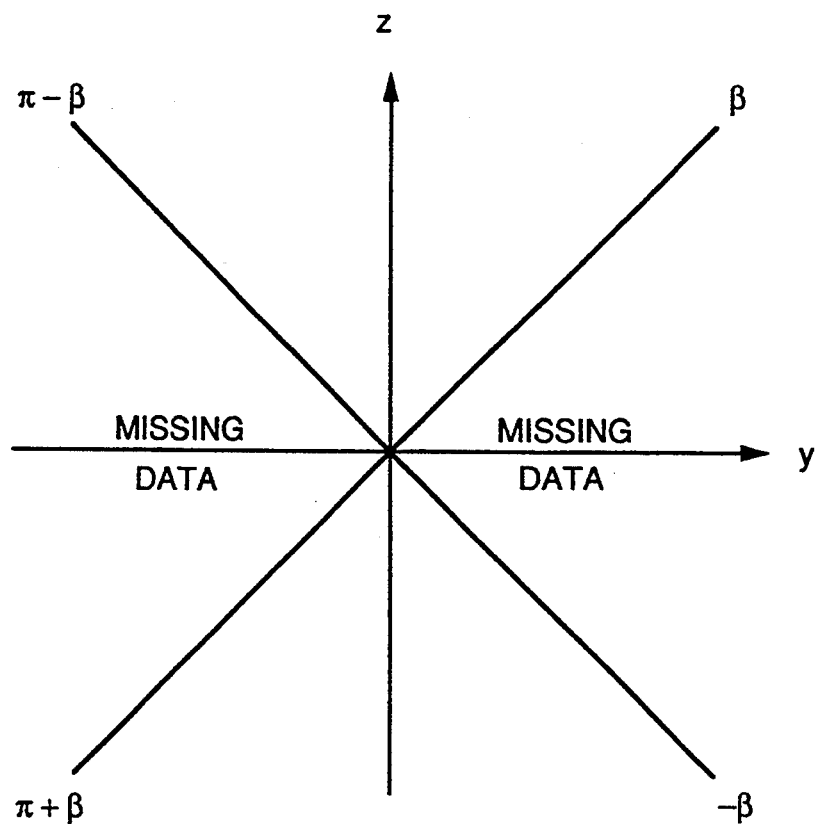
Figure 14:
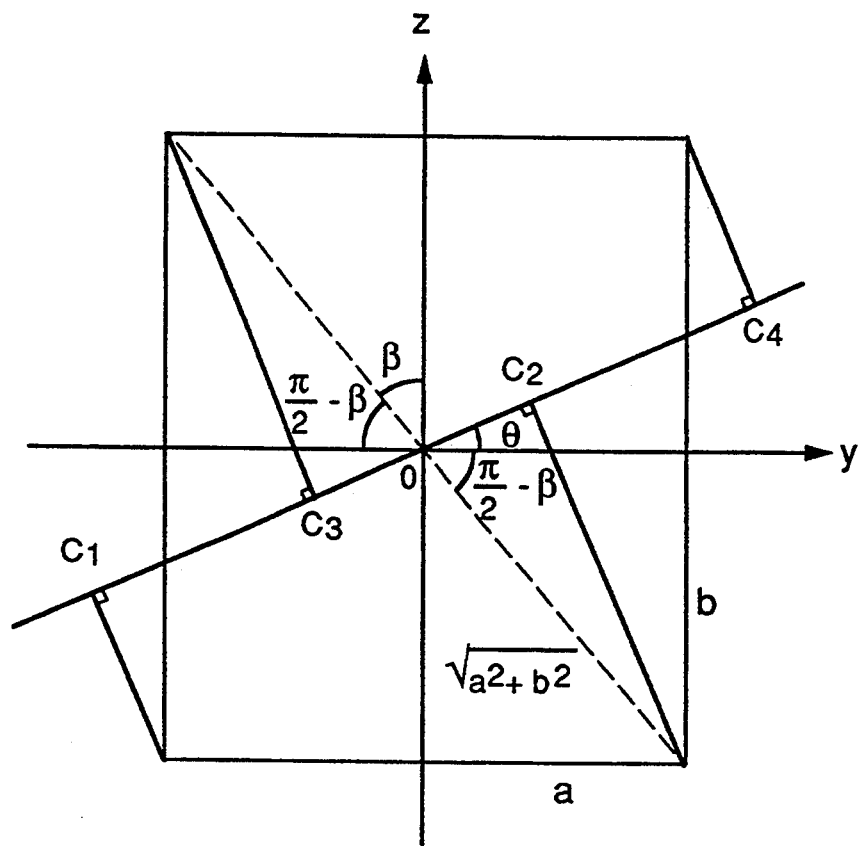
FIG. 14 is an illustrative linear projection indicating the case where normal surface of integration planes corresponding to points in Radon space intersect the portion of interest and both the region above and below the portion of interest.
Figure 15:
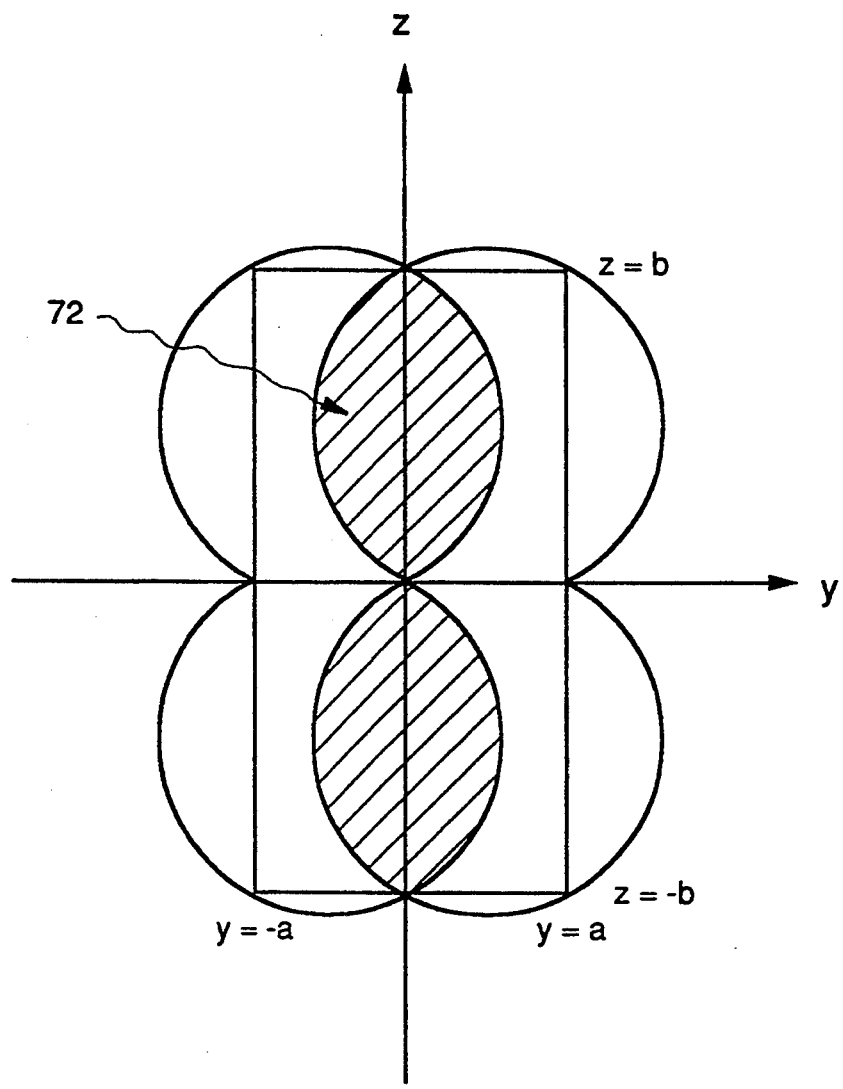
FIG. 15 illustrates sparsely collected Radon data obtained from planes intersecting the region of interest only (shaded) shown in relation to the minimum volume of Radon space to be filled in order to provide complete Radon data for the portion of interest.

These angular ranges are indicated in FIG. 13. When line L falls within this angular range, the orthogonal projections of corners $C_1$, $C_2$, $C_3$ and $C_4$ of the top and bottom edges of the cylinder will overlap as indicated in FIG. 14. For such case, a line through any point on L orthogonal to L will intersect either the top or the bottom edge of the cylinder. Pictorially constructed, the available Radon data in the yz plane are illustrated in FIG. 15. The missing data are shown relative to hatched markings representing Radon data from planes intersecting only the portion of interest 72. This constitutes limited angle data which are truncated, as such the use of apriori object boundary data as discussed in copending application Ser. No. 07/631,514 is not sufficient to recover the missing information.

However, if the scanning orbit includes a scan at the top or bottom level of the portion of interest of the region of support in the object space much more information can be obtained. By referring to FIG. 12, it can be seen that for points lying along $C_1C_2$ and $C_3C_4$ Radon data become available. The reason that such data are not available in the first place is that the datum at each point on these line segments involves a planar integral traversing the region of the object beyond the $z=\pm b$ level. But now as a result of disregarding unwanted contributions, the contribution of the region beyond the $z=\pm b$ level can be eliminated and these Radon data become available. Radon data whose planar integrals intersect both the region above the $z=b$ level and the region below the $z=-b$ level as indicated by segment $C_2C_3$ in FIG. 14 remain unavailable; since although the contribution of the former can be eliminated, that of the latter cannot. These data correspond to the line segments on the vertical plane in FIG. 10 intersecting both the top and the bottom edges of the rectangle. Such missing data fall within the angular range expressed in Equation (1) and illustrated diagrammatically in FIG. 13. The reason being that the orthogonal projections of the top and bottom edges of the rectangle do not overlap, consequently the orthogonal line through any point on these lines intersects either the top or the bottom edges, or none, but never both edges. This is the situation of FIG. 12. But, for the radial lines inside the angular range of FIG. 13 the orthogonal projection of the top and the bottom edges on these lines overlap, as shown in FIG. 14. Therefore, for points on these lines, lying in the overlap region between $C_2$ and $C_3$ of FIG. 14, orthogonals therefore intersect both the top and the bottom edges. Thus, the Radon data cannot be computed for these points. The minimum radius below which Radon data cease to be available is given by $$r_{min} = |OC_2| \qquad (2)$$
$$= \sqrt{a^2 + b^2} \cos(\theta + \pi/2 - \beta)$$

The orthogonal line through a point located between the origin O and the point $C_2$ will intersect both the top and the bottom edges. Since the overlap occurs as illustrated in FIG. 14, Radon data is no longer available along segment $C_2C_3$.

The same arguments can be made relative to a scan about the $z=-b$ level. As such arguments will not be reproduced for the $z=-b$ case.

Figure 16:
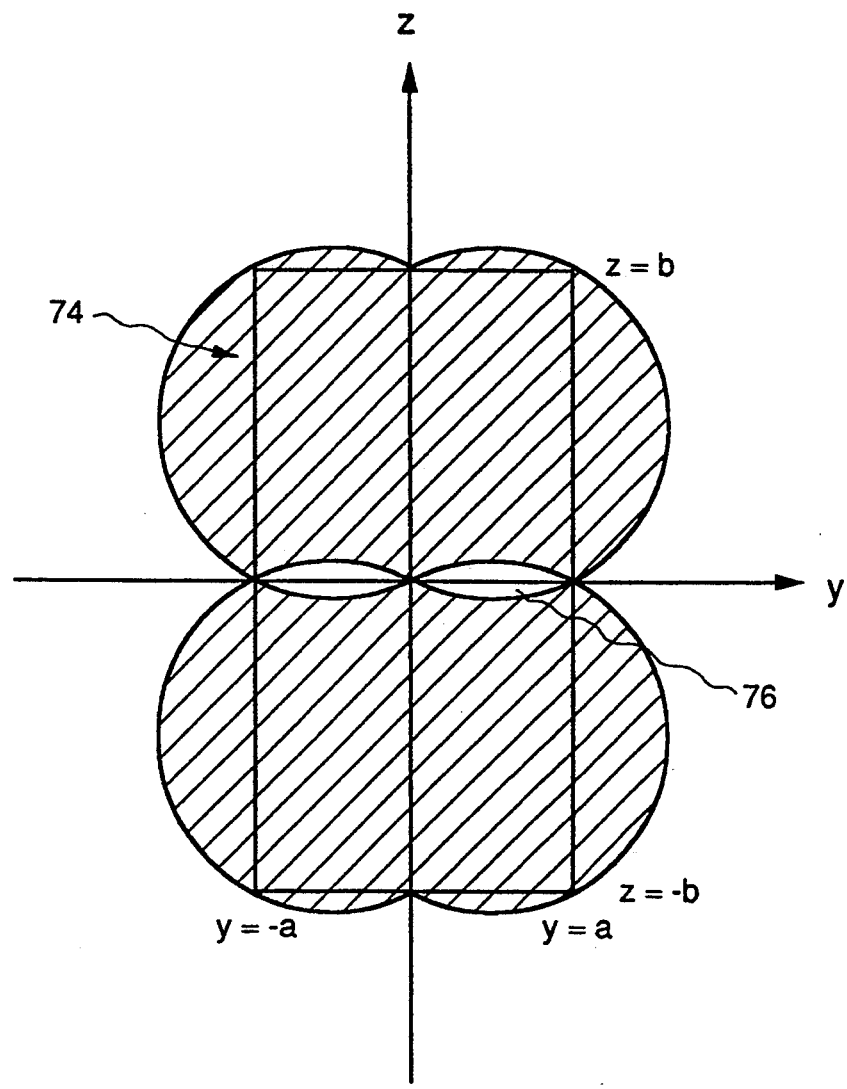
FIG. 16 illustrates more densely collected Radon data obtained from top and bottom scans wherein planes intersecting the portion of interest and either the region above or below the portion of interest (shaded) shown in relation to the minimum volume of Radon space to be filled in order to provide complete Radon data for the portion of interest.
Figure 18:
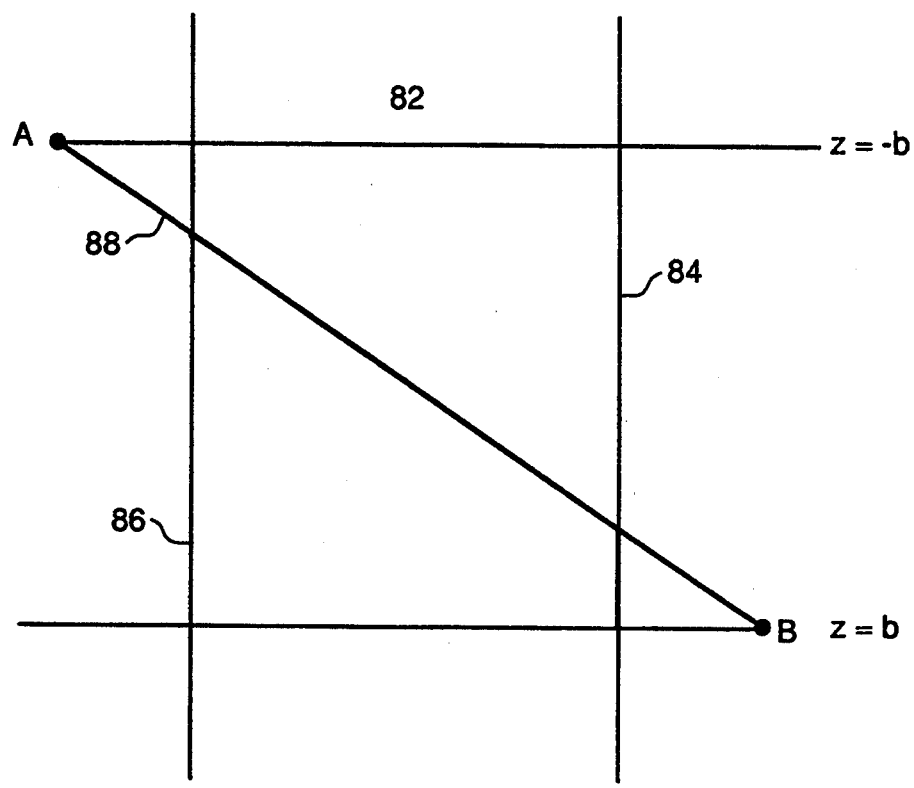
FIG. 18 illustrates a plurality of source positions corresponding to a plurality of partial integration surfaces which taken together constitute an integration surface over a cross section through the portion of interest for exactly determining the radial derivative of the planar integral of object density over the portion of interest.

By performing both the scan at the top level and the scan at the bottom level, we can obtain the data 74 indicated in FIG. 16 which adds Radon data for planes intersecting the portion of interest and either the region above or the region below to the Radon data available for planes intersecting the portion of interest only 72 shown in FIG. 15. Clearly the data is substantially more complete; however, missing data exists in the form of two pockets 76 along the y axis as shown in FIG. 16. But, even in these missing cones, the data is not completely missing, as the cones are only hollow. Using another manipulative procedure, even the two pockets of missing data of FIG. 16 can be eliminated to provide a complete data set for exact reconstruction. This is accomplished by combining cone beam data from top and bottom level scans for each plane intersecting both top and bottom levels of the portion of interest. The method is shown diagrammatically in FIG. 18 wherein a plane through the object intersects the region above the $z=b$ level and below the $z=-b$ level, showing cone beam source positions A and B corresponding to top and bottom scan planes respectively. As previously mentioned, with an upper scan only the contribution to the planar integral from the region above the $z=b$ level 82 can be eliminated, the contribution from the other region remains. The same is true of the lower scan. One can refer to the part of the plane covered by the cone beam rays emitted at source position A between the top level and the line AB as partial plane A 84, and the portion of the plane covered by the cone beam rays emitted at source position B between the bottom level and the line AB as partial plane B 86. These partial planes do not intersect those portions of the object above the top level $z=b$ nor below the bottom level $z=-b$; but together the partial planes make up a cross section of the portion of interest intersected by a plane 88 comprised of these partial planes. For respective source positions A and B only the portion of the cone beam data on the corresponding partial plane is used in computing the Radon datum. This results in the radial derivative of the planar integral over the object density being computed on each respective partial plane 84,86. Combining these partial plane contributions gives the radial derivative of the planar integral over the cross section of the portion of interest 88. For planes intersecting the orbit of the top and bottom scans respectively and corresponding scanning orbits which circumscribe the cross section of the object at the top and bottom level respectively, there are always four source positions associated with each plane. Two are associated with the top scan and two are associated with the bottom scan.

For each point in Radon space similarly categorize and analyze cases 1 through 4 which characterize a plane through a point orthogonal to a line joining the origin to that point. Planar integrals are computed in a like manner; however, using this approach each of the four above cases characterizing planar integrals over the plane of concern can be computed, and the portion of interest can be reconstructed exactly. Since this method is exact, the portion of interest of the object is reconstructed without compromising image quality.

Figure 17:
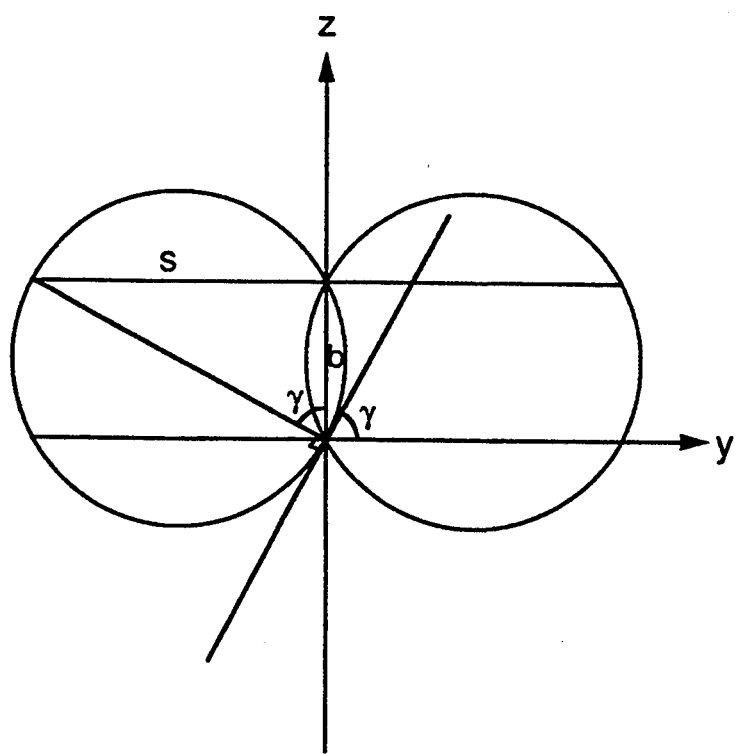
FIG. 17 indicates that two pockets of Radon data are missing when scans at the top and bottom of the cylindrical portion of interest are taken and illustrates how these pockets of missing data are determined.

It can be shown in FIG. 17 that the two missing pockets lie in the angular range given by $$[\gamma, \pi - \gamma]$$

and $$[\pi + \gamma, -\gamma]$$

where $$\gamma = \tan^{-1}\frac{s}{b}$$

Note s is the radius of the circular scanning orbit. Because $s \geq a$, the missing angular range is characterized by $\beta = \tan^{-1}(a/b)$, it can be seen that these two pockets are outside the missing angular range of FIG. 13; thus, the Radon data they represent can be filled in by any scan connecting the top and bottom scans.

In either case, the scope of applicability has been extended to include inspection of large objects that cannot fit within the field of view of a conventional cone beam source and inspection of only a portion of interest of an object. Both find applicability in industrial and medical domains.

In view of the foregoing, it will be appreciated that the present invention enables exact 3D reconstruction of the image of a portion of interest of an object in the field of view of a cone beam source by selectively disregarding unwanted Radon data which may corrupt the imaging process and selectively recovering Radon data that would otherwise be lost wherein a complete Radon data set for imaging is acquired through proper choice of scanning configuration and selective partitioning and manipulation of the acquired data.

While specific embodiments of the invention have been illustrated and described herein, it is realized that numerous modifications and hinges will occur to those skilled in the art. It is therefore understood that the appended claims are intended to cover all such modifications and changes as fall within the true spirit and scope of the invention.

What is claimed is:

1. A computer-related method of acquiring complete Radon data for exact reconstruction of a three dimensional image of a select portion of an object, wherein a region of support in the object space bounds said portion, said region of support in the object space being enclosed within a field of view of at least one cone beam source emitting a beam, said source being fixed with respect to a corresponding detector, said method comprising the steps of:

selectively scanning with said beam along a path enclosing said region of support in the object space at the upper and lower extent of said portion respectively, said upper and lower scan paths being joined by a connecting scan path, said upper, lower, and connecting scan paths collectively defining a complete scan path for said select portion;

selectively partitioning each surface of integration corresponding to a data point in Radon space based on the intersection of said surface with said portion; and selectively manipulating corresponding cone beam data according to said partitioning in order to discard data not directly attributable to said portion and recover otherwise missing data directly attributable to said portion.

2. A computer-related method according to claim 1 wherein said step of selectively partitioning each said surface of integration further comprises categorizing said surface according to the manner in which said surface intersects said portion.

3. A computer-related method according to claim 2 wherein categorizing is accomplished into categories as follows:

said surface does not intersect said portion;

said surface intersects only said portion;

said surface intersects said portion and either a region above said portion or a region below said portion, but not both;

said surface intersects said portion and both said region above and said region below said portion.

4. A computer-related method according to claim 3 wherein said step of selectively manipulating corresponding cone beam data comprises:

selectively disgarding cone beam data contributed from regions beyond the region of support in the object space bounding said portion to eliminate otherwise image corrupting data.

5. A computer-related method according to claim 3 wherein said step of selectively manipulating corresponding cone beam data comprises:

selectively combining cone beam data obtained from said upper and lower scans to recover data otherwise missing due to corruption by regions beyond the region of support in the object space bounding said portion.

6. A computer-related method according to claim 4 wherein said step of selectively disgarding further comprises recognizing that for upper and lower level scanning respectively, a source cone beam ray intersects the detector either at scan level or on either side of said scan level thereby providing a discernable feature for identifying Radon data which is not directly attributable to said portion.

7. A computer-related method according to claim 5 wherein said step of selectively combining further comprises distributing surface integral determination of a radial derivative of object density associated with computation of cone beam detector integrals among a plurality of partial surfaces corresponding to a plurality of corresponding source positions along respective source scan paths wherein said plurality of partial surfaces comprises a cross sectional surface of integration through said portion of the object.

8. Apparatus for acquiring complete Radon data for exactly reconstructing a three dimensional image of a select portion of an object comprising:

cone beam source for emitting a beam;

detector means fixed with respect to said cone beam source;

means for scanning with said beam source along an upper and lower path, each path respectively enclosing upper and lower extents of a region of support in the object space bounding said select portion of said object to be imaged, said region of support in the object space being enclosed within a field of view of said cone beam source;

means for scanning a connecting scan path between said upper and lower scan paths, said upper, lower, and connecting scan paths collectively defining a complete scan path for said select portion;

means for selectively discarding corresponding cone beam data attributable to regions beyond the region of support in the object space bounding said portion;

means for selectively recovering corresponding cone beam data directly attributable to said portion although missing due to corruption attributable to regions beyond the region of support in the object space bounding said portion; and means for collecting retained cone beam data for image processing.

9. A computer-related method according to claim 1 wherein said upper scan path extends 360° around an upper end of said select portion and said lower scan path extends 360° around a lower end of said select portion.

10. A computer-related method according to claim 9 wherein said upper scan path is planar and in an upper plane and said lower scan path is planar and in a lower plane.

11. A computer-related method according to claim 10 wherein said upper scan path is circular and said lower scan path is circular.

12. A computer-related method according to claim 11 wherein said upper and lower planes are parallel and said connecting scan path is a straight line perpendicular to said upper and lower planes.

13. Apparatus of claim 8 wherein said upper scan path extends 360° around an upper end of said select portion and said lower scan path extends 360° around a lower end of said select portion.

14. Apparatus of claim 13 wherein said upper scan path is planar and in an upper plane and said lower scan path is planar and in a lower plane.

15. Apparatus of claim 14 wherein said upper scan path is circular and said lower scan path is circular.

16. Apparatus of claim 15 wherein said upper and lower planes are parallel and said connecting scan path is a straight line perpendicular to said upper and lower planes.

* * * * *